(12) United States Patent
Oberle et al.

(10) Patent No.: US 10,374,715 B2
(45) Date of Patent: Aug. 6, 2019

(54) OPTICAL DISTRIBUTION NETWORK PROTECTION

(71) Applicant: ALCATEL LUCENT, Boulogne-Billancourt (FR)

(72) Inventors: Karsten Oberle, Stuttgart (DE); Bartlomiej Kozicki, Berchem (BE); Thomas Pfeiffer, Stuttgart (DE)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/735,365

(22) PCT Filed: Jun. 21, 2016

(86) PCT No.: PCT/EP2016/064256
§ 371 (c)(1),
(2) Date: Dec. 11, 2017

(87) PCT Pub. No.: WO2017/001235
PCT Pub. Date: Jan. 5, 2017

(65) Prior Publication Data
US 2018/0175939 A1 Jun. 21, 2018

(30) Foreign Application Priority Data

Jun. 29, 2015 (EP) .................................... 15306020

(51) Int. Cl.
*H04B 10/27* (2013.01)
*H04J 14/02* (2006.01)
*H04B 10/25* (2013.01)

(52) U.S. Cl.
CPC ......... *H04B 10/27* (2013.01); *H04B 10/2503* (2013.01); *H04J 14/023* (2013.01); *H04J 14/0256* (2013.01); *H04J 14/0282* (2013.01)

(58) Field of Classification Search
CPC ... H04B 10/27; H04B 10/2053; H04J 14/023; H04J 14/0256; H04J 14/0282;
(Continued)

(56) References Cited

U.S. PATENT DOCUMENTS

2006/0120724 A1* 6/2006 Ishimura ............. H04J 14/0226
398/75
2007/0092256 A1* 4/2007 Nozue ................. H04J 14/0282
398/72

(Continued)

FOREIGN PATENT DOCUMENTS

| CN | 103931209 A | 7/2014 |
|---|---|---|
| EP | 2775643 A1 | 9/2014 |
| WO | WO-2014/131352 A1 | 9/2014 |

OTHER PUBLICATIONS

"OLI-High Level Objectives the Open Lambda Initiative High Level Objectives OLI-High Level Objectives Content <http://scholar.google.com/scholar?q=>", Jun. 9, 2011 (Jun. 9, 2011), http://www.openlambdainitiative.org, pp. 1-39, XP055234840, Retrieved from the Internet <URL:http://www.openlambdainitiative.org/pdf/OLI High Level Objectives.pdf>.

(Continued)

*Primary Examiner* — Ted M Wang
(74) *Attorney, Agent, or Firm* — Harness, Dickey & Pierce, P.L.C.

(57) ABSTRACT

The network comprises a plurality of optical line terminals which communicate with a plurality of optical network units over an optical distribution network. The optical distribution network includes a plurality of optical filters controlled by a network controller. A first optical line terminal sends a request for optical communication with at least one optical network unit to the network controller. The request is sent over the optical distribution network and indicates an operating wavelength of the first optical line terminal and of the (Continued)

at least one optical network unit. The network controller configures at least two of the optical filters to allow a passing through of the operating wavelength or of a further operating wavelength. The optical communication between the first optical line terminal and the at least one optical network unit in the operating or in the further operating wavelength is established through the optical filters.

7 Claims, 5 Drawing Sheets

(58) Field of Classification Search
CPC ............... H04J 14/0227; H04J 14/0221; H04J 14/0212; H04J 14/0283
See application file for complete search history.

(56) References Cited

U.S. PATENT DOCUMENTS

| | | | |
|---|---|---|---|
| 2011/0236017 A1* | 9/2011 | Ohlen | H04J 14/0282 398/34 |
| 2013/0136447 A1 | 5/2013 | Cavaliere et al. | |
| 2014/0161446 A1* | 6/2014 | Lee | H04J 14/0221 398/34 |
| 2014/0233954 A1 | 8/2014 | Lee et al. | |

OTHER PUBLICATIONS

Pfeiffer T: "Converged heterogeneous optical metro-access networks <http://scholar.google.com/scholar?q=>", 36th European Conference and Exhibition on Optical Communication : (ECOC 2010) ; Torino, Italy, Sep. 19-23, 2010, IEEE, Piscataway, NJ, USA, Sep. 19, 2010 (Sep. 19, 2010), pp. 1-6, XP031789993, ISBN: 978-1-4244-8536-9.

International Search Report PCT/ISA/210 for International Application No. PCT/EP2016/064256 dated Sep. 8, 2016.

Written Opinion of the International Searching Authority PCT/ISA/237 for International Application No. PCT/EP2016/064256 dated Sep. 8, 2016.

Korean Office Action dated May 30, 2019 for KR Patent Application No. 10-2018-7002587.

* cited by examiner

OPTICAL DISTRIBUTION NETWORK PROTECTION

CROSS-REFERENCE TO RELATED APPLICATIONS

This application is a national phase under 35 U.S.C. § 371 of PCT International Application No. PCT/EP2016/064256 which has an International filing date of Jun. 21, 2016, which claims priority to European Application No. 15306020.7, filed Jun. 29, 2015, the entire contents of each of which are hereby incorporated by reference.

TECHNICAL FIELD

This application is directed, in general, to optical transmission systems and, more specifically, to systems, apparatus and methods for protection of optical distribution networks.

BACKGROUND

A passive optical network (PON) is a network architecture employing fiber cables to connect a central office to local premises. It employs passive optical components to enable optical feeder fiber to serve multiple premises. A PON consists of one or more central office (CO) nodes, where the optical line terminal (OLT) equipment is located, one or more termination nodes at customer premises, called optical network terminations (ONT) or optical network units (ONU) and further infrastructure such as optical fiber, power splitters (PSs), filters, etc. which connect the central office node to the termination nodes. This infrastructure is called the optical distribution network (ODN). In other words, the ODN provides the optical transmission medium from the OLT towards the ONUs and vice versa.

A passive optical network may operate over multiple wavelengths in a wavelength-division multiplexing (WDM) scheme. An example of such network is the standardized Gigabit passive optical network (NGPON2) operating over 4 wavelengths in TWDM-PON scheme. A TWDM-PON is a multiple wavelength PON solution in which each wavelength is shared between multiple optical network units by employing time division multiplexing and multiple access mechanisms.

The case where the owner of the fiber infrastructure of the optical distribution network is different from the operator of the active network equipment (such as the optical line termination) occurs more and more in today's utilization of passive optical networks. FIG. 1 shows an architectural diagram of a PON implementation where in the central office location a network provider operates active network equipment consisting of four different OLTs operating at four different wavelengths λ1-λ4 multiplexed to one fiber. The optical distribution network constitutes the domain of fiber infrastructure and is managed by an infrastructure provider who can be different from the network provider.

For such a setup it is possible to deploy unbundling of the access network at the physical level, for instance due to regulation needs. The type of physical unbundling being typically considered for this case is the "wavelength per service provider". This can provide the best level of isolation of network providers operating over the same optical fiber but on different wavelengths. Such a scenario of physical unbundling with the "wavelength per service provider" scheme with 4 network providers (NPs) is illustrated in FIG. 2. The figure illustrates the case where not all NPs with their associated wavelength are located at the same Central Office (CO) location. Each NP has its own OLT as shown in FIG. 2 as OLT1, OLT2, OLT3 and OLT4. Each OLT operates on a different wavelength, i.e. each OLT sends and receives signals of a different wavelength.

In the case of unbundled optical infrastructure, each of the wavelength planes is operated separately and must not be necessarily located at the same CO location. Each OLT and ONU must operate at the upstream (US) and downstream (DS) wavelength designated for that network operator so that the traffic between them does not collide with traffic from other operators transported over the same optical infrastructure. With the term uplink or upstream we refer to signals travelling from the ONUs to the OLT. With the term downlink or downstream we refer to signals travelling from the OLT to the ONUs. Furthermore a security issue may occur in the case that an ONU or OLT becomes able to receive signals originating from network providers other than its own network provider.

Reference has been made until now to OLT and ONT since we refer to the passive optical network (PON) system. The unbundling scenario can also be applicable to the case of co-existence of PON with other optical systems, such as a common public radio interface (CPRI) optical system.

In the case where not all OLTs are located at the same CO location there is a risk that DS traffic originating from e.g. OLT4 when transmitting on the wrong wavelength is creating collision with DS traffic of any other NP on the same distribution network.

Furthermore the physical unbundling may increase the dynamicity in the system (as well as in the ODN) as customers might change their NP and related services more frequently or even receive traffic from multiple NPs in parallel. In these cases the ONUs would be required to change the allocated wavelength of a respective NP or be able to receive optical signals of multiple wavelengths. This would require the ODN to be enhanced in a way which would enable the connection of any ONU to any required OLT and vice versa.

In a WDM PON system it is today assumed that all NPs are fed into the ODN from the same CO location. In a physically unbundled solution, as shown in FIG. 2, a network provider having OLT4 might want to use the ODN (when several network providers share the ODN through physical unbundling) from a different location than the ones of OLT1, OLT2 and OLT3. This case is not yet covered by any existing solution.

SUMMARY

It is an object of the present invention to obviate the above disadvantage and provide a method, an optical device and an optical communication system which allow an advantageous protection of an optical distribution network.

A method for optical communication in a bidirectional optical communication network is proposed. The network comprises a plurality of optical line terminals which communicate with a plurality of optical network units over an optical distribution network. The optical distribution network comprises a plurality of optical filters controlled by a network controller. A first optical line terminal sends a request for optical communication with at least one optical network unit to the network controller. The request is sent over the optical distribution network and indicates an operating wavelength of the first optical line terminal and of the at least one optical network unit. The network controller configures at least two of said optical filters to allow a passing through of said operating wavelength or of a further operating wavelength. Finally the optical communication between the first optical line terminal and the at least one optical network unit in said operating or in said further operating wavelength is established through said optical filters.

A network controller for controlling an optical communication in an optical communication system is also proposed. The network controller comprises an interface which is adapted to receive from an optical line terminal a request for optical communication with at least one optical network unit. This optical communication is over an optical distribution network. The request indicates an operating wavelength of the first optical line terminal and of the at least one optical network unit. The network controller further comprises a processor which is adapted to process said request received by the interface and to configure a plurality of optical filters so that they allow a passing through of optical signals in the operating wavelength or in a further operating wavelength.

Finally an optical communication system is proposed. The system comprises a plurality of optical line terminals. These terminals are adapted to send and receive optical signals. The system further comprises a plurality of optical network units which are adapted to send and receive optical signals. The optical communication system further comprises a network controller which is adapted to receive from said optical line terminals requests for communication with said optical network units over an optical distribution network. These requests indicate an operating wavelength of said optical line terminals and of at least one optical network unit. The optical communication system finally comprises a plurality of optical filters which can be configured by said network controller so that they allow a passing through of optical signals in the operating wavelength or in a further operating wavelength.

BRIEF DESCRIPTION OF THE DRAWINGS

Reference is now made to the following descriptions taken in conjunction with the accompanying drawings, in which.

DETAILED DESCRIPTION

Embodiments of methods, optical devices and systems are described herein for the protection of an optical distribution network.

Figure 1:
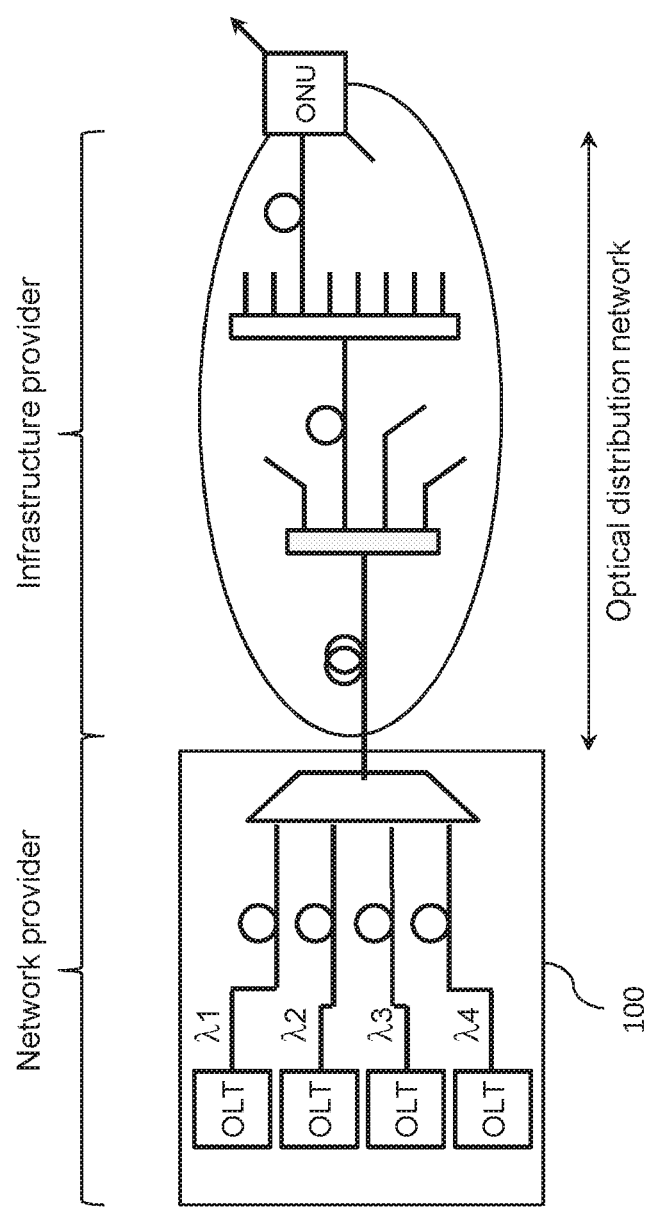
FIG. 1 shows a prior art passive optical network.
Figure 2:
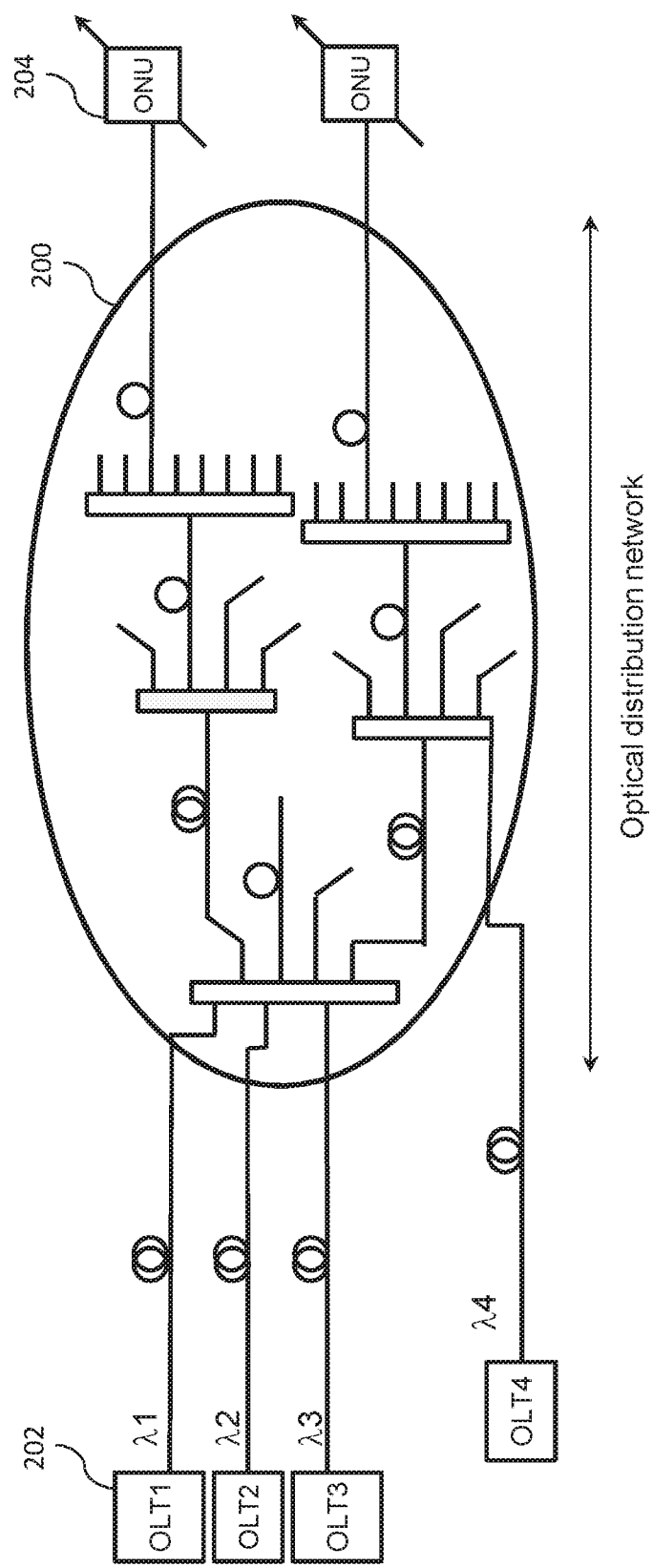
FIG. 2 shows a prior art unbundled passive optical network.
Figure 3:
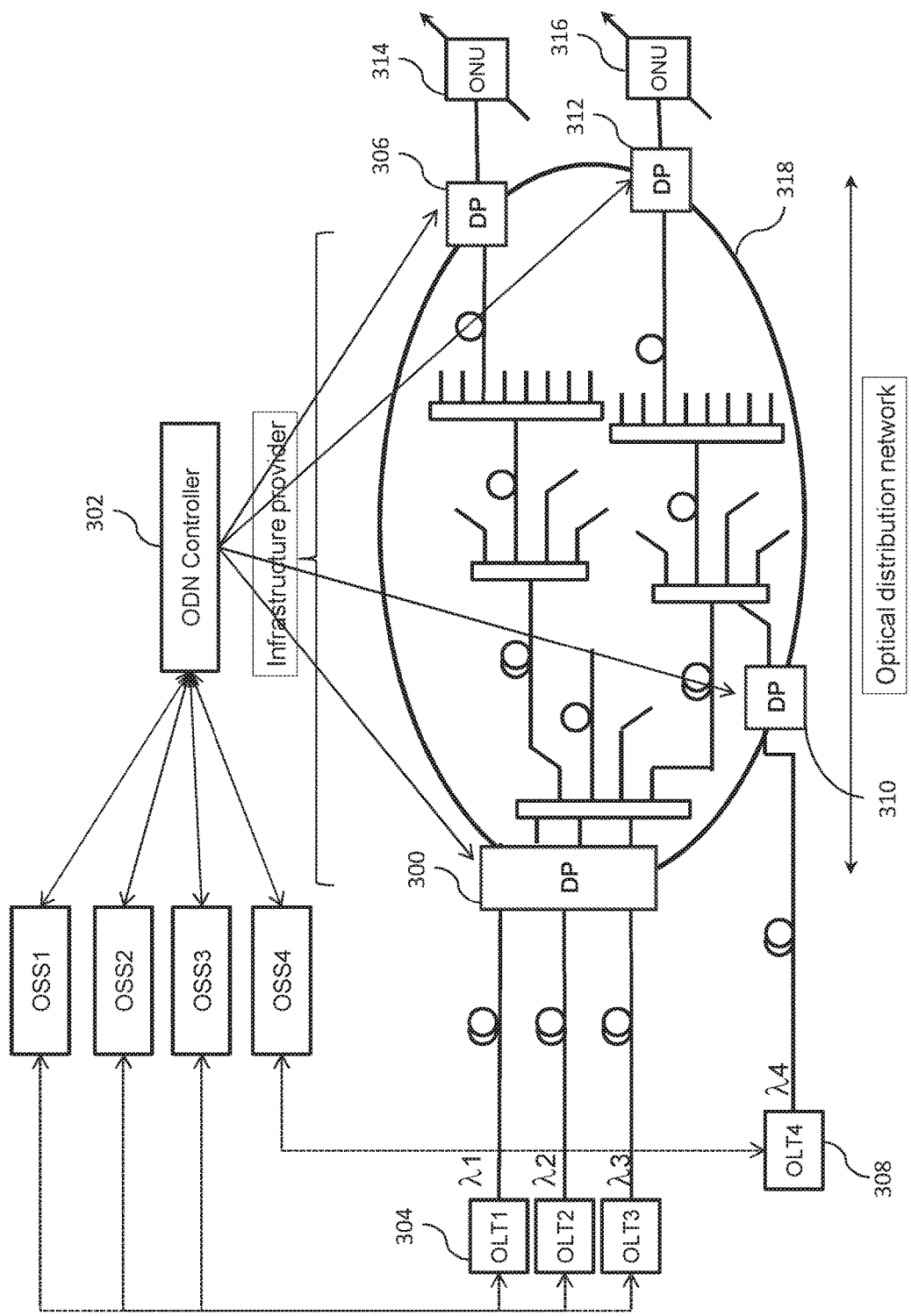
FIG. 3 shows an optical communication system according to the invention.

FIG. 3 shows an architectural diagram of an optical communication system according to the proposed invention. Demarcation Points (DP) are placed at entry points of the ODN 318. They can be remotely configured and controlled by an ODN controller 302. The ODN controller 302 may also be referred to as a network controller. Each DP contains a bi-directional filter for US and DS. In FIG. 3 only one DP 300 for all three OLTs (OLT1, OLT2, OLT3) is shown for simplicity. This means that in DP 300 there are actually 3 DPs contained, one for each wavelength pair (US/DS). Hence it can be said that each DP is a set of filters for downstream and upstream per network provider.

Each DP is operated to allow transmission of only the respective wavelengths allocated for the OLTs and ONUs in downstream and upstream from and to the ODN. The association of network provider and operating wavelength and the particular ONU with the given network provider is done at the level of OSS of the respective network provider. In FIG. 3 these OSSs are shown as OSS1, OSS2, OSS3 and OSS4.

The demarcation points can be remotely configured by the ODN controller 302 as mentioned above. The ODN controller normally belongs to the infrastructure provider operating the ODN and thus can be also operated by the provider. Nevertheless the ODN controller may also belong to an operator or another third party, independent of the infrastructure provider. The ODN controller is connecting to the OSSs of all NPs connected to the ODN in order to get the information required from all NPs on e.g. wavelength management in DS and US.

The invention is based on the fact that, in general, the ODN controller holds information about the available and occupied wavelengths in DS and US directions and exchanges that information with operation support systems (OSSs) of all network providers which want to use the ODN to connect to their customer, namely the ONUs. As occupied WLs we refer to the WLs which are already used from ongoing communication between OLTs from different network providers and ONUs at the customer side.

In one embodiment, the ODN controller may configure the DPs and instruct the OSSs of the different network providers to configure their respective OLTs to the required wavelength.

In another implementation the OSSs of the NPs may request access to the ODN at their chosen wavelength and the ODN controller can accept the request and configure the DPs so that they allow a passing through of optical signals with the chosen wavelength.

It may happen that the ODN controller rejects the request of an OLT to access the ODN if the wavelength required by the NP is not available. In this case there can be the option that the ODN controller checks with the OSSs of other OLTs if it would be possible to re-arrange the WL arrangements between OLTs and the respective ONUs. In that way WLs could become free so that a rejected request for ODN access could be satisfied.

The allocation of wavelengths could also be instructed from an external controller (not shown in FIG. 3). In that case it would be neither the OSSs nor the ODN controller which would allocate wavelengths to the different OLT-ONU pairs.

The DPs 300, 306, 310, 312 are configured so that OLT4 and the related ONU(s) can access the ODN via the allocated access point and transmit optical signals of only the allocated WL(s) through the ODN in a downstream and upstream direction.

Figure 4:
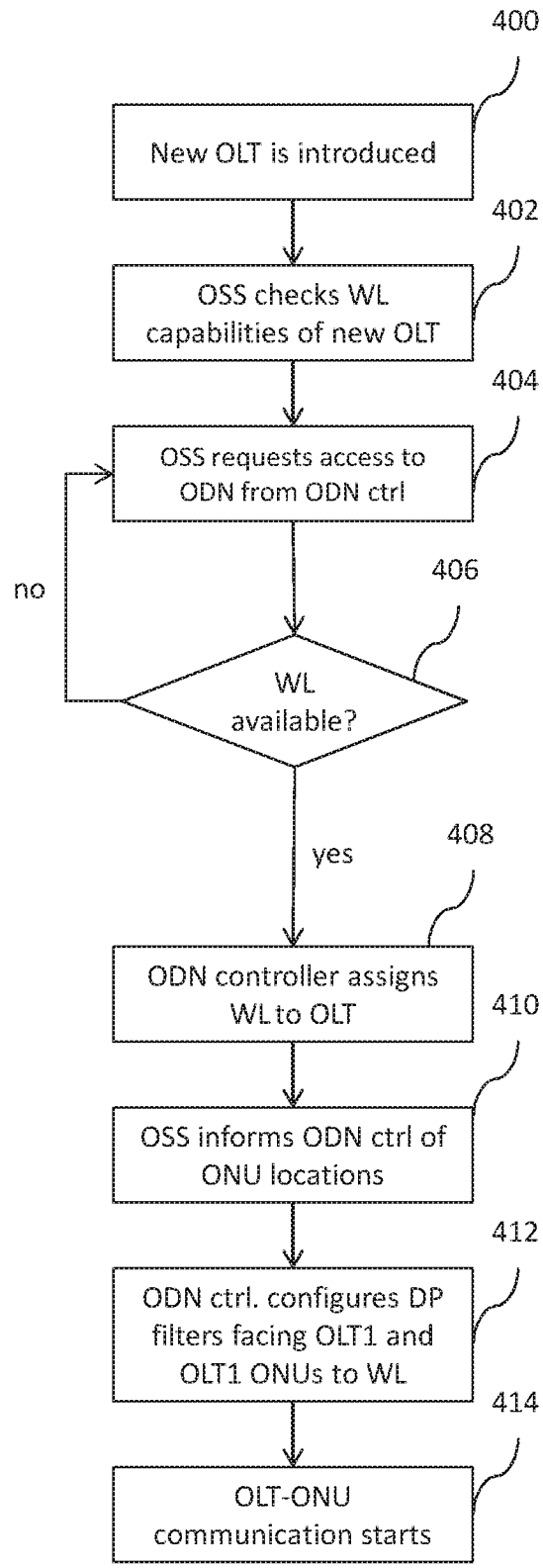
FIG. 4 shows a flowchart of the proposed method.

FIG. 4 shows a flowchart of the method according to the invention. The method starts in step 400 when a new OLT is introduced in an optical communication system, e.g. the system shown in FIG. 3. The new OLT can belong to a new network provider or to one which is already part of the communication system. It is assumed that this new OLT wants to use a shared ODN, e.g. the one shown in FIG. 3, in order to connect to a customer of the network provider. The actual connection would then be to one or more ONUs at the customer side. The OSS that is responsible for the new OLT would check, in step 402, the operating wavelength of this new OLT. This means that the OSS checks at which wavelength or wavelengths the new OLT may send and receive optical signals. In step 404 the OLT requests access over the OSS to the optical distribution network. This request is sent to the ODN controller and indicates the operating wavelength of the OLT. The operating wavelength indicated in the request may be different from the one checked in step 402 in the sense that it is the wavelength in which the OLT intends to communicate through the ODN with one or more ONUs.

In step 406 the ODN controller checks if the wavelength indicated in step 404 by the OLT is available. It may be that the indicated WL is used by another OLT for communication with an ONU through the optical distribution network. In that case in the check box of step 406 the answer would be "no" and the loop would lead back to step 404 where the OLT would have to indicate another operating WL. In case the answer in the checkbox of step 406 is positive the requested operating WL is available and in step 408 the ODN controller assigns this WL to the OLT which made the request. That would mean that the ODN controller and the respective OSS connected to the OLT would register that this OLT would use this specific WL for communication. This registration makes the control for available WLs for future connection requests possible.

In step 410 the OSS that is responsible for the OLT which has sent the request for communication informs the ODN controller of the locations of the ONUs that the OLT wants to connect to. The ODN controller may already have information of which demarcation points exist in the connection path between the OLT and the ONUs with which connection is requested. Alternatively the ODN controller may request this information from another entity outside the communication system.

In step 412 the ODN controller configures the filters in the DPs which are between the OLT and the ONUs so that they allow a passing through of optical signals in the operating wavelength. In case the control of step 406 has shown that this WL is not available and another WL has been indicated then in step 412 the filters are configured to allow optical signals in this WL to pass through. The filters need to be so configured as to allow the optical signals in both the downstream and the upstream direction. For this reason we consider that at least two filters need to be configured by the ODN controller, one for the downstream and one for the upstream direction.

Once the filters in the respective DPs have been configured then in step 414 the communication between the OLT and the ONUs is established in the designated wavelength which can pass through the filters of the demarcation points.

It should be appreciated by those skilled in the art that the block diagram of FIG. 4 represents conceptual views of illustrative circuitry embodying the principles of the invention. Similarly, it will be appreciated that the flow chart represents various processes which may be substantially carried in a computer readable medium and be executable by a computer or processor, whether or not such computer or processor is explicitly shown.

Figure 5:
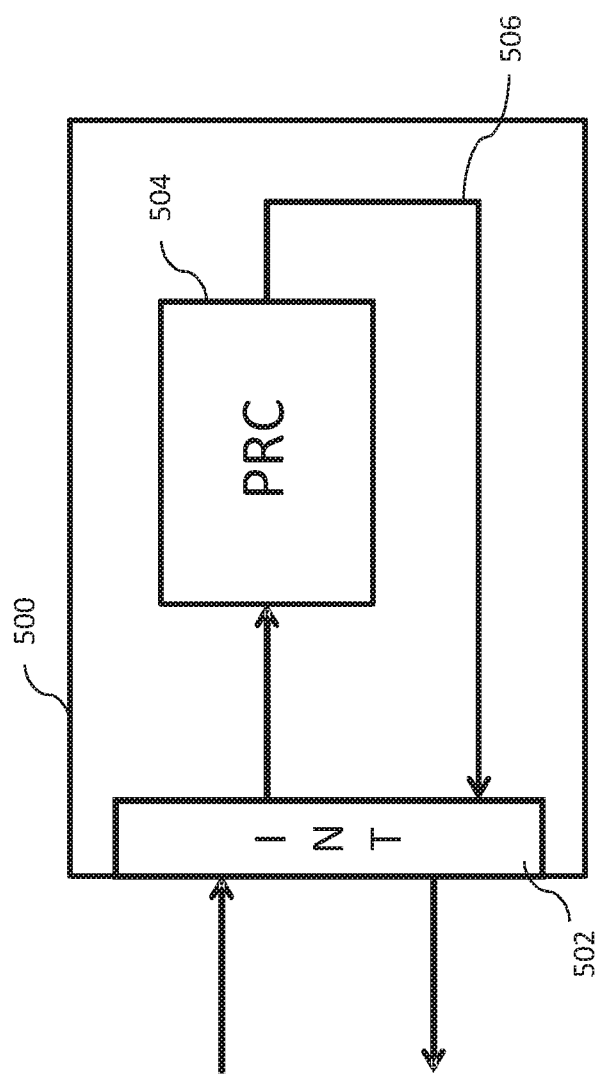
FIG. 5 shows a network controller according to the invention.

FIG. 5 shows a network controller 500 according to the invention. This network controller may also be called an ODN controller and can execute the functions of the ODN controller as described until now in the text. The network controller comprises an interface 502 through which it can receive, among others, connection requests from OLTs of network providers that want to use an ODN to connect to their customers' ONUs. These requests are forwarded by the interface 502 to the processor 504 of the network controller 500. The connection requests indicate the operating wavelength of the OLT which sent them, as described above. The processor 504 processes these requests received by the interface. It then decides how the filters in the demarcation points need to be configured in order to allow optical signals of the operating wavelength to pass through them. This configuration may be done by sending the appropriate signals from the processor to the demarcation points over the interface 502.

The functions of the various elements shown in FIG. 5, including any functional blocks labeled as 'processors', may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term 'processor' or 'controller' should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

Using the techniques revealed in this invention, it is possible to co-ordinate the use of multiple wavelengths in an optical distribution network shared by multiple network operators and to physically protect the infrastructure from incorrect allocations of wavelengths thereby preventing disruptions in operation.

The application of the solution described by this invention has a number of advantages. An OLT can only send optical signals on the WL allocated and related to its NP into the ODN. Due to this the OLT cannot disrupt operation of OLTs operating at other downstream wavelengths. Further the ONU can only receive optical signals on the WL allocated and related to its NP from the ODN. The ONU can only receive information from the associated OLT, reducing the possibility of sniffing on traffic of other network providers, thereby increasing the security of the optical network. The OLTs can only receive optical signals on the WL allocated and related to their NP from the ODN. Further an OLT can only receive information from the associated ONUs, thus reducing the possibility of sniffing on traffic of other network providers, thereby increasing the security.

In general implementing the invention, the ODN is protected from any transmission of traffic into the ODN other than on authorized WL from the respective NP or ONUs. This is a required pre-condition to deploy physical unbundling over a common ODN as isolating traffic of the individual NPs and protecting from cross traffic (e.g. traffic collisions). This protection of the infrastructure provider and its ODN is a requirement for future physical unbundled PON systems to serve multiple NP's over the same physical infrastructure.

The above description and the accompanying figures merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method for optical communication in a bidirectional optical communication network comprising a plurality of optical line terminals, a plurality of optical network units and an optical distribution network comprising a plurality of optical filters controlled by a network controller, the method comprising the steps of
   sending from a first optical line terminal to the network controller a request for optical communication with at least one optical network unit over the optical distribution network, the request indicating an operating wavelength of the first optical line terminal and of the at least one optical network unit;
   checking, by the network controller, an availability of the operating wavelength;
   configuring, by the network controller, at least two of the plurality of optical filters to allow a passing through of optical signals of the operating wavelength or, if the operating wavelength is unavailable, configuring, by the network controller, at least two of the plurality of optical filters to allow a passing through of optical signals of a further operating wavelength;
   establishing the optical communication between the first optical line terminal and the at least one optical network unit in the operating wavelength or in the further operating wavelength through the at least two of the plurality of optical filters.

2. The method according to claim 1 wherein if the operating wavelength is available the network controller configures the at least two of the plurality of optical filters to allow a passing through of optical signals of the operating wavelength.

3. A network controller for controlling an optical communication in an optical communication system, the network controller comprising an interface adapted to receive from an optical line terminal a request for optical communication with at least one optical network unit over an optical distribution network, the request indicating an operating wavelength of the optical line terminal and of the at least one optical network unit, the network controller further comprising a processor being adapted to process the request received by the interface and to configure a plurality of optical filters to allow a passing through of optical signals in the operating wavelength or in a further operating wavelength if the operating wavelength is unavailable.

4. The network controller of claim 3, wherein the processor is adapted to configure the plurality of optical filters through the interface.

5. An optical communication system, comprising a plurality of optical line terminals adapted to send and receive optical signals, a plurality of optical network units adapted to send and receive optical signals, the optical communication system further comprising a network controller adapted to receive from the plurality of optical line terminals requests for communication with the plurality of optical network units over an optical distribution network, the requests indicating an operating wavelength of the plurality of optical line terminals and of at least one optical network unit of the plurality of optical network units, the optical communication system further comprising a plurality of optical filters configurable by the network controller to allow a passing through of optical signals in the operating wavelength of the plurality of optical line terminals and of the at least one optical network unit of the plurality of optical network units or in a further operating wavelength of the plurality of optical line terminals and of the at least one optical network unit of the plurality of optical network units if the operating wavelength of the plurality of optical line terminals and of the at least one optical network unit of the plurality of optical network units is unavailable.

6. The optical communication system of claim 5 further comprising at least one operation support system serving the plurality of optical line terminals.

7. The optical communication system of claim 6 wherein the requests for communication with the plurality of optical network units over the optical distribution network are received from the at least one operation support system.

* * * * *